2 Sheets—Sheet 1.

E. S. CHURCHMAN.
Dust-Conveyer for Thrashing-Machine.

No. 201,331. Patented March 19, 1878.

Witnesses:
P. C. Dieterich
Frank H. Duffy

Inventor:
Edward S. Churchman
Per C. H. Watson & Co. Attorneys.

N. PETERS, PHOTO-LITHOGRAPHER, WASHINGTON, D. C.

E. S. CHURCHMAN.
Dust-Conveyer for Thrashing-Machine.

No. 201,331. Patented March 19, 1878.

Witnesses:
P. C. Dietrich
Frank H. Duffy

Inventor:
Edward S. Churchman
Per C. H. Watson & Co. Attorneys.

UNITED STATES PATENT OFFICE.

EDWARD S. CHURCHMAN, OF PLAIN CITY, OHIO.

IMPROVEMENT IN DUST-CONVEYERS FOR THRASHING-MACHINES.

Specification forming part of Letters Patent No. 201,331, dated March 19, 1878; application filed September 20, 1876.

*To all whom it may concern:*

Be it known that I, E. S. CHURCHMAN, of Plain City, in the county of Madison and State of Ohio, have invented certain new and useful Improvements in Thrashing-Machines; and I do hereby declare the following to be a full, clear, and exact description thereof, reference being had to the accompanying drawings, and to the letters of reference marked thereon.

The nature of my invention consists in the construction and arrangement of an attachment for thrashing-machines, having for its object to facilitate the working of the machine, and to separate and carry off the dust from the point where it first originates, as will be hereinafter more fully set forth.

In order to enable others skilled in the art to which my invention appertains to make and use the same, I will now proceed to describe its construction and operation, referring to the annexed drawings, which form a part of this specification, and in which—

Figure 1:
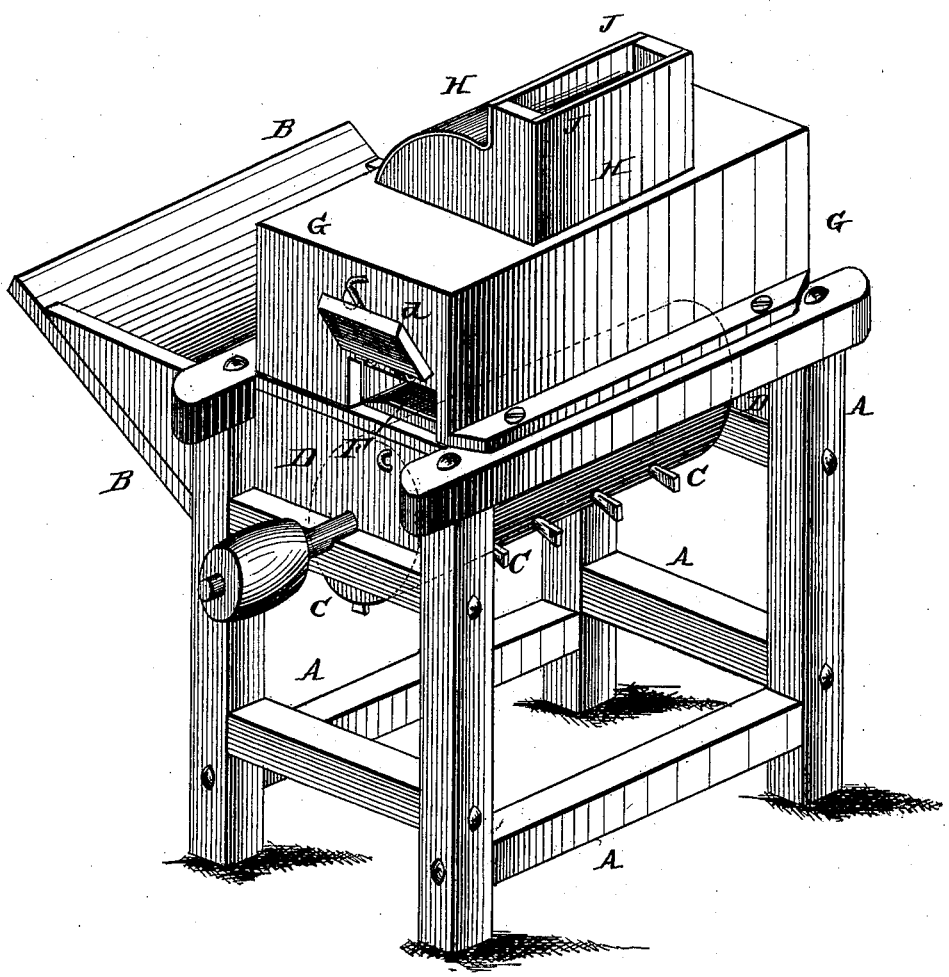
Figure 2:
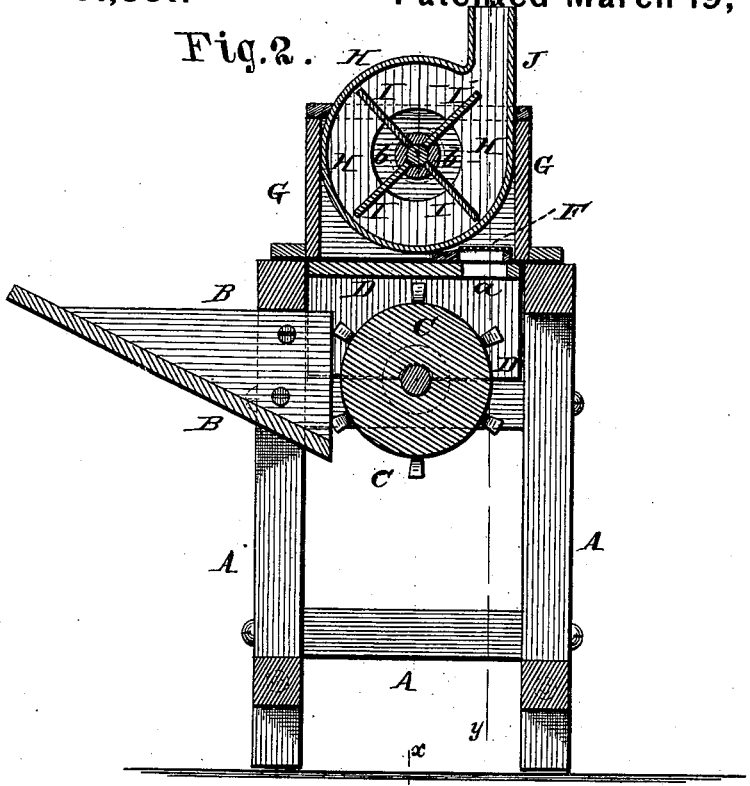
Figure 3:
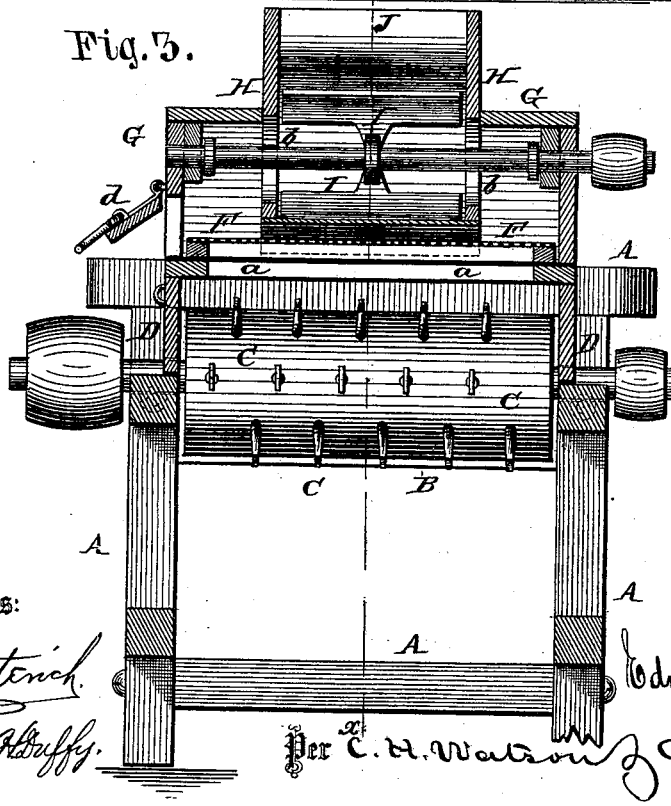

Figure 1 is a perspective view of a part of a thrashing-machine with my attachment applied thereto. Fig. 2 is a transverse vertical section through the line $x$ $x$ of Fig. 3. Fig. 3 is a vertical section through the line $y$ $y$ of Fig. 2.

A represents part of the frame-work of a thrashing-machine, with feed-table or hopper B, and C is the thrashing-cylinder, constructed in any of the known and usual ways.

The cylinder C is inclosed at the top and sides by a case, D, and in the top of this case, above the rear portion of the cylinder, is an aperture, $a$, extending the entire length from side to side, or nearly the entire length. Over this aperture, on top of the case, is laid a removable sieve, F. On top of the case D is secured a box, G, containing in the center a fan-case, H, with suction-fan I therein. The sides of the fan-case have suitable openings $b$, as shown, and a discharge-spout, J, extends upward from said fan-case. In the side of the box G is a door, $d$, hinged at the top, and of such dimensions that by opening said door the screen F can be pulled out when required.

When the thrashing-machine is in operation, it will be seen that the fan I draws the dust from the cylinder C and feed-hopper B directly upward through the screen F into the box G, thence through the fan-case to and out through the discharge-spout.

It will thus be seen that the dust is taken from the inside of the cylinder-case D just at the point where it first originates, the fan drawing it through said cylinder cap or case directly in the rear of the cylinder, and in doing so it increases the draft of the machine, thereby making it take the grain more easily.

This attachment not only protects the feeder from dust, but also from flying grain and sticks from the cylinder. It makes the machine feed easier and more regularly, and takes all the dust away from the machine.

The screen F prevents anything but the dust from passing upward.

The draft can easily be regulated by opening the door $d$ more or less; and the screen may be removed from the box G through said door, when necessary, for cleaning the same, or for other purposes.

This attachment is applicable to any thrashing-machine.

I am well aware that suction-fans and dust-conveyers have been arranged, in combination with thrashing-machines, in various ways; and I do, therefore, not claim such, broadly, as my invention. I take the dust from the inside of the cylinder-cap directly over the rear portion of the cylinder, so as to commence the suction, as it were, just at the point where the dust originates.

Having thus fully described my invention, what I claim as new, and desire to secure by Letters Patent, is—

In a thrashing-machine, the combination, with the feed-hopper B and cylinder C, of the cap D, having aperture $a$, the removable screen F, box G, with hinged side door $d$, and the fan-case H, with fan I and discharge-spout J, all constructed and arranged to operate substantially as and for the purposes herein set forth.

In testimony that I claim the foregoing as my own I affix my signature in presence of two witnesses.

EDWARD S. CHURCHMAN.

Witnesses:
J. S. BRITTON,
HENRY W. BOWSER.